US005289718A

United States Patent [19]
Mousseau

[11] Patent Number: 5,289,718
[45] Date of Patent: Mar. 1, 1994

[54] APPARATUS AND METHOD FOR MEASURING TIRE FORCE

[75] Inventor: Cedric W. Mousseau, Lake Orion, Mich.

[73] Assignee: Ford Motor Company, Dearborn, Mich.

[21] Appl. No.: 988,581

[22] Filed: Dec. 10, 1992

[51] Int. Cl.⁵ ............................................. G01M 17/02
[52] U.S. Cl. ............................................. 73/146; 73/8
[58] Field of Search ................................. 73/146, 8, 7

[56] References Cited

U.S. PATENT DOCUMENTS

| | | | |
|---|---|---|---|
| 1,478,532 | 12/1923 | Schafer | 73/8 |
| 1,849,730 | 3/1932 | Morse | 73/146 |
| 2,313,156 | 3/1943 | Kratt, Jr. | 73/146 |
| 3,209,585 | 10/1965 | Wolstenholme et al. | 73/844 |
| 3,398,397 | 8/1968 | O'Connell | 73/146 |
| 4,986,118 | 1/1991 | Pottinger | 73/146 |
| 4,989,449 | 2/1991 | Monch | 73/146 |

FOREIGN PATENT DOCUMENTS 627371  8/1978  U.S.S.R. .

*Primary Examiner*—Donald Q. Woodiel
*Attorney, Agent, or Firm*—Raymond L. Coppiellie; Roger L. May

[57] ABSTRACT

An apparatus for measuring a force produced by a tire assembly over an irregular surface is disclosed comprising a test block having a plurality of removable blanks which define a first and second surface over which the tire assembly is rolled during the test. The first surface is stepped relative to the second surface. The apparatus further includes a pair of transducers disposed across the first and second surface for generating an electrical signal indicative of the force produced by the tire assembly.

6 Claims, 2 Drawing Sheets

APPARATUS AND METHOD FOR MEASURING TIRE FORCE

BACKGROUND OF THE INVENTION

1. Field of the Invention

The present invention relates generally to an apparatus for determining the force produced by a tire assembly. More particularly, the present invention relates to an apparatus which determines the force produced by a tire over a stepped or uneven surface.

2. Disclosure Information

Various systems have been proposed for measuring tire contact pressure indicative of the force produced by the tire. These systems measure the tire force to aid in the testing and design of the tire tread for example. An example of one such system is disclosed in U.S. Pat. No. 4,986,118 wherein a test apparatus includes a plurality of tire contact pressure sensors mounted in a linear array across a bearing plate which the tire rolls over during the test. Strain gauges are secured to the pressure sensors and provide an electrical signal having a characteristic indicative of the measured tire force. The known system described works well when testing a tire over a flat, even road surface but no means are disclosed for testing the tire on a stepped or uneven road surface. Furthermore, when a plurality of pressure sensors are used, it is necessary to provide a microprocessor or other data collecting apparatus having a plurality of data channels for receiving the plurality of generated signals. The plurality of pressure sensors also increases the cost of the test apparatus.

It would be advantageous to provide a test apparatus which overcomes the deficiencies of the known system and is capable of testing a tire over an irregular or stepped surface without adding to the cost of the system or the complexity involved in receiving a plurality of data signals.

SUMMARY OF THE INVENTION

Responsive to the deficiencies in the prior art, there is disclosed herein an apparatus for measuring a force produced by a tire assembly at a predetermined location over an irregular surface, the apparatus comprising a test block having a first and second surfaces over which the tire assembly to be tested is rolled, the first surface being stepped relative to the second surface. The apparatus further comprises at least two force measuring means disposed at predetermined locations in the test block, a first force measuring, means being disposed across the first surface and a second force measuring means being disposed across the second surface of the test block. The two force measuring means each have a longitudinal axis generally perpendicularly to the direction of travel of the tire assembly and are operative to generate an electrical signal indicative of force produced by the tire assembly at that predetermined location. The apparatus also includes signal receiving means for receiving the electrical signals from the force measurement means and for storing the signals so that a distribution plot of the tire forces can be generated. In one embodiment, the test block comprises a plurality of removable blanks, each blank having a longitudinal axis disposed generally perpendicularly to the direction of the travel of the tire assembly, the plurality being axially aligned adjacent one another along respective longitudinal axes.

There is also disclosed herein a method of producing a force distribution map of a plurality of forces produced by a tire assembly at a plurality of predetermined locations as the tire assembly rolls across a test apparatus having a stepped surface. The test apparatus is configured generally as described above and the method comprises the steps of: (a) removing two blanks from a first predetermined position of the test apparatus and inserting a first and second transducer therein; (b) rolling the tire assembly across the test apparatus and measuring the force produced at each of the transducers; (c) storing the force measurements generated by each of the transducers in a processor means; (d) removing the transducers from the first predetermined positions and replacing the two blanks therein; (e) removing two blanks from a second predetermined position remote from the first predetermined position and inserting the two transducers therein; (f) repeating steps (b–e) until a predetermined number of force measurements are stored in the processor means and (g) plotting the stored force measurements to obtain the force distribution map.

In this manner, the present invention presents advantages over the known prior art systems in that the present invention can measure head-on and oblique tire contact events over an uneven surface. By utilizing removable blanks and inserting transducers therein, the present invention also reduces the number of transducers and measurement channels required to obtain data and significantly reduces the cost of the test apparatus. These and other objects features and advantages of the present invention will become apparent from the drawings, detailed description and claims which follow.

DETAILED DESCRIPTION OF THE PREFERRED EMBODIMENTS

Figure 1:
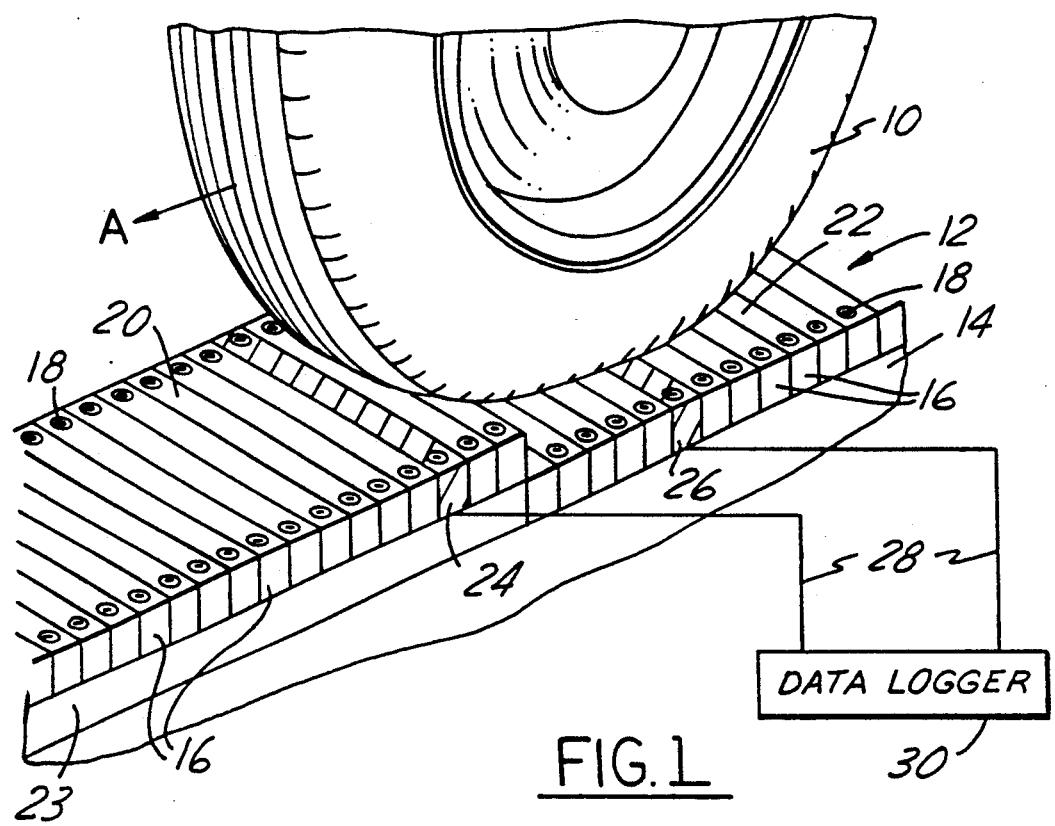
FIG. 1 is a perspective view of a tire assembly and a test apparatus structured in accord with the principles of the present invention

Referring now to the drawings, FIG. 1 shows a tire assembly 10 placed on a test apparatus 12 of the present invention for measuring the force produced by the tire assembly 10 at predetermined locations over an irregular surface. The test apparatus 12 includes a test block 14 having a plurality of removable blanks 16 secured thereto by threaded rod fasteners 18. Each of the blanks 16 has a longitudinal axis disposed generally perpendicularly to the direction of travel of the tire assembly as shown by arrow A. Each of the blanks 16 are axially aligned adjacent one another along respective longitudinal axes and as shown, are configured as approximately the same length and width The plurality of blanks 16 define a first surface 20 and a second surface 22 over which the tire assembly 10 is rolled while performing the force measurement testing The first surface 20 is stepped relative to the second surface 22 so that the test apparatus 12 can measure head-on and oblique tire contact events. First surface 20 is stepped relative to second surface 22 by means of an insert 23 disposed between the plurality of blanks defining surface 20 and the test block 14. Alternatively, the first surface 20 can be stepped by providing a plurality of blanks 16 having a greater height than the blanks forming the second surface 22.

The test apparatus 12 further includes a pair of force measurement means, such as transducers 24 and 26. Each of the transducers is approximately the same size and shape as a removable blank 16. The first transducer 24 is positioned across the first surface 20 so that the longitudinal axis of the first transducer 24 is disposed generally perpendicularly to the direction of travel of the tire assembly 10. The second transducer 26 is similarly positioned across the second surface 22 of the test apparatus 12. Each of the transducers is electrically connected by wires 28 to a data logger 30, generally a microprocessor which receives the signals generated by the each of the transducers 24, 26 and stores the information in a memory. Many known types of processors are available in the art which perform these functions.

Figure 4:
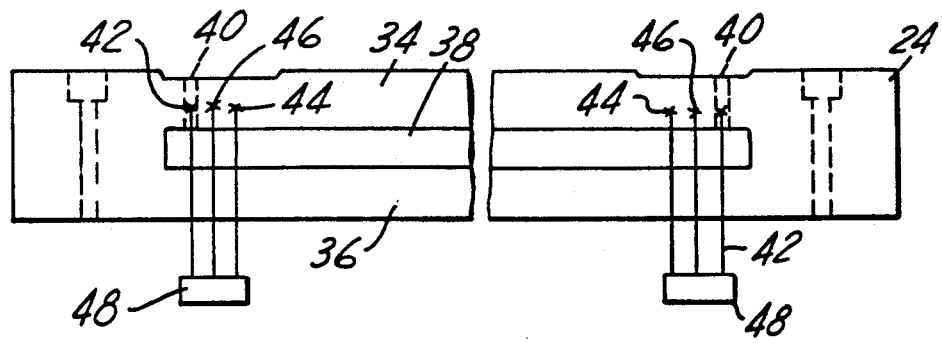
FIG. 4 is a cross sectional view of a force measurement means of the present invention.

Referring to FIG. 4, a cross-sectional view of one of the transducers 24 is shown. The transducer 24 is an elongate member having an upper beam 34 cantilevered at both ends with respect to a lower beam 36 with a free space 28 therebetween. The height of the upper beam 34 can be varied to change the transducer gain in a system of the present invention. The upper beam 34 includes an aperture 40 of predetermined circumference and a plurality of strain gauges disposed at each end thereof. Each end of the transducer 24 includes a shear gauge 42 disposed on the beam 34 over aperture 40. The shear gauge 42 measures the vertical component of the force as the tire is rolled over the upper beam 34 causing the beam 34 to flex under the force. The aperture 40 acts as a stress concentrator to amplify the vertical component measurement. The transducer 24 further includes a pair of bending gauges 44, 46 disclosed at each end thereof which measure the lateral and longitudinal components of the force produced by the tire assembly 10. The three force components are then averaged over the entire area of the transducer 24 to determine a force measurement at that particular point in the test apparatus. The strain gauges 42, 44 and 46 are electrically connected by wires 47 to a female lead 48 which can be connected to the data logger or other type of processor.

Figure 2:
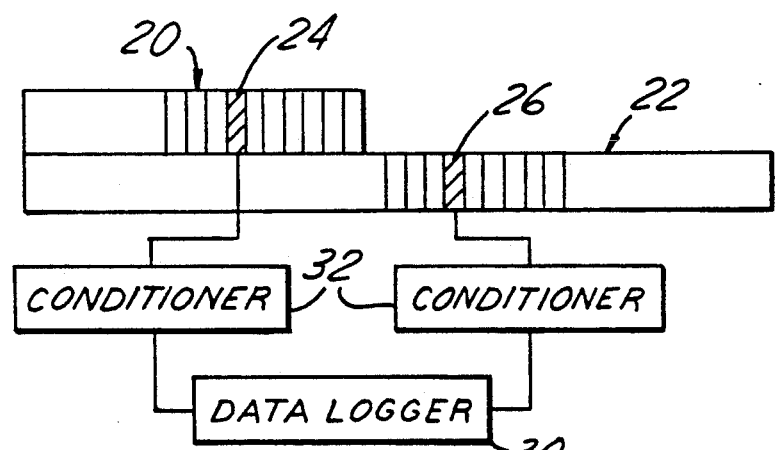
FIGS. 2 and 3 are cross sectional views of the test apparatus of FIG. 1.
Figure 3:
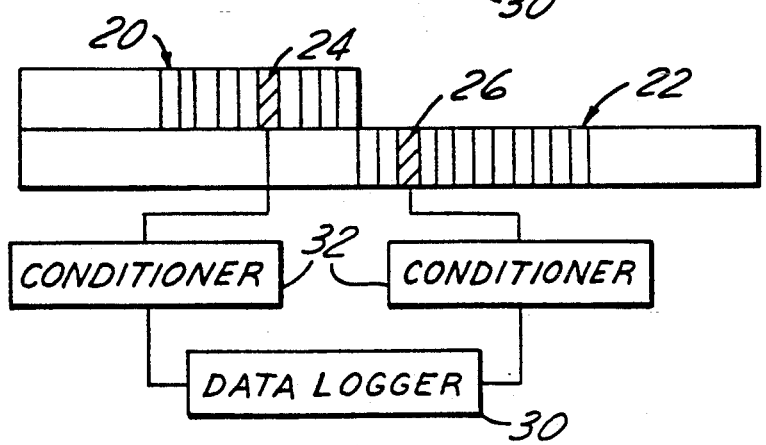

FIGS. 2 and 3 illustrate the method of use of the present invention. As shown in FIGS. 2 and 3, each of the transducers 24, 26 is connected to the data logger 30 by means of a signal conditioner 32. The conditioner provides a voltage to each of the strain gauges and measures the resistance changes produced therein. The resistance changes are then sent through the conditioners to the computer where the changes are digitized and assigned a contact pressure value, such as in N/mm. The conditioners 32 may be provided separately or may be built into the data logger or processor 30.

As shown in FIG. 2, the first transducer 24 and the second transducer 26 are placed at predetermined positions within the test apparatus 12. The transducers 24, 26 are placed in two openings previously by metal blanks 16. The transducers are secured to the test block 14 by threaded rod fasteners 18. The tire assembly 10 is then rolled across the surfaces 20, 22 of the test apparatus and the resulting signals produced thereby are generated by the transducers 24, 26 and stored in the processor 30. In the next step, the transducers are removed and the metal blanks re-inserted into their original locations and an additional pair of metal blanks 16 are re-moved at a second predetermined location remote from the first, such as shown in FIG. 3. The transducers 24, 26 are then placed in these two slots and the tire is rolled across the test surface again. As can be seen by comparing FIGS. 2 and 3, the first and second transducers 24, 26 have been moved relative to each other to occupy a second predetermined position remote from the first. By supplying removable blanks and interchanging the transducers with the blanks, the present invention reduces the number of transducers necessary to perform the measurement of the tire contact events as well as reducing the number of data channels required to perform the measurement.

Figure 5A:
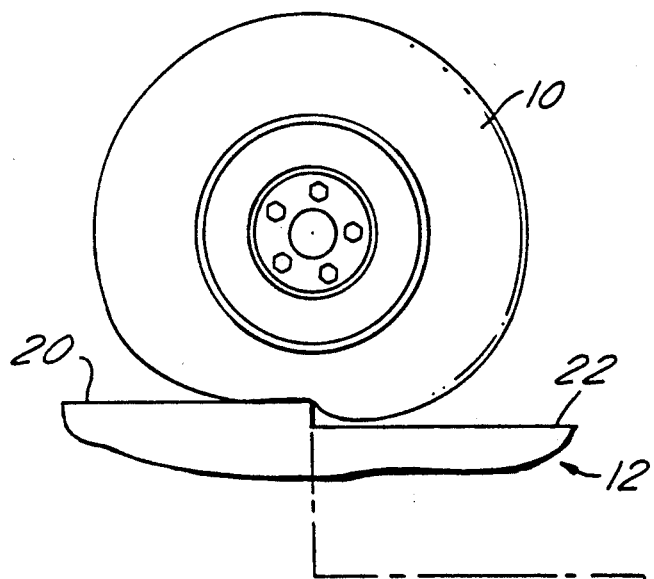
FIGS. 5A and 5B represent a force distribution plot generated utilizing an apparatus and method of the present invention.
Figure 5B:
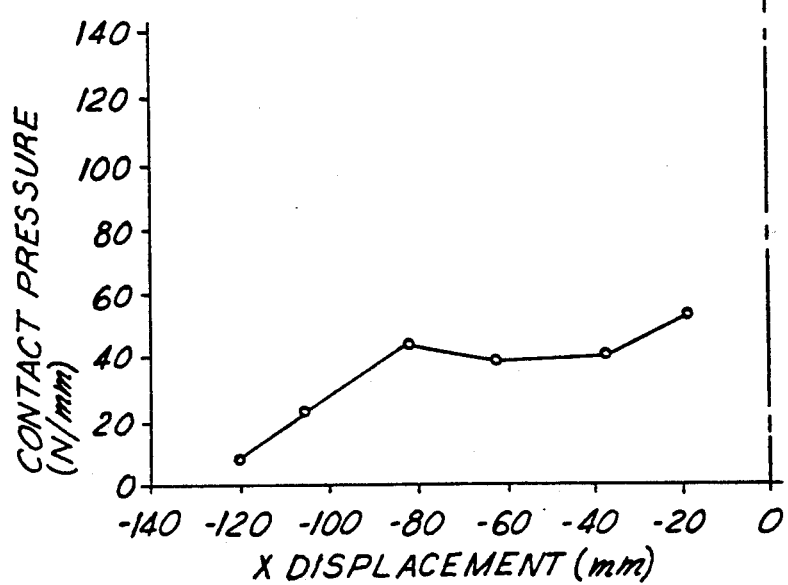

The above steps are repeated until a predetermined number of positions have been measured by interchanging the removable blanks 16 with the transducers 24, 26 at a plurality of positions. When the measurements have been gathered, a force distribution plot can be generated similar to that shown in FIG. 5B. As shown in FIG. 5B, displacement versus contact pressure is plotted for the tire assembly 10 and test apparatus 12 shown in FIG. 5A. The interface of the stepped surfaces 20, 22 is marked as "0" and successive readings of tire pressure at various displacements from the origin are shown in the plot. By utilizing the present invention and the force distribution plot generated thereby, the accuracy of tire model algorithms can be verified. The present invention can also be used to determine or predict the stiffness of the tire treads of the tire assembly 10 in evaluations on irregular and uneven surfaces.

Various modifications and alterations of the present invention will no doubt occur to those skilled in the art. For example, the principles of the present a step surface as shown in the present application. It is the following claims, including all equivalents which define the scope of the invention.

What is claimed is:

1. An apparatus for measuring a force produced by a tire assembly at a predetermined location over an irregular surface, comprising:

a test block having a first and second surfaces over which said tire assembly to be tested is rolled, said first surface being stepped relative to said second surface;

at least two force measuring means disposed at predetermined locations in said test block, a first force measuring means of said at least two force measuring means being disposed across said first surface and a second force measuring means being disposed across said second surface of said test block, said at least two force measuring means having a longitudinal axis disposed generally perpendicularly to the direction of travel of said tire assembly, said at least two force measuring means being operative to generate an electrical signal representative of a force produced by said tire assembly at that predetermined location; and signal receiving means for receiving said electrical signals from said at least two force measurement means and for storing said signals.

2. An apparatus according to claim 1, wherein said test block comprises a plurality of removable blanks, each blank of said plurality having a longitudinal axis disposed generally perpendicular to the direction of travel of said tire assembly, said plurality being axially aligned adjacent one another along respective longitudinal axes.

3. An apparatus according to claim 2, wherein each of said at least two force measuring means comprises a transducer, said transducer being configured to be interchanged with said removable blanks of said test block at a plurality of positions in said test block.

4. An apparatus according to claim 3, wherein said transducer comprises three strain gauges.

5. An apparatus for measuring a force produced by a tire assembly at a predetermined location over an irregular surface, comprising:
- a test block comprising a plurality of removable blanks, each blank of said plurality having a longitudinal axis disposed generally perpendicular to the direction of travel of said tire assembly, said plurality being axially aligned adjacent one another along respective longitudinal axes, said Plurality of blanks defining first and second surfaces over which said tire assembly to be tested is rolled, said first surface being stepped relative to said second surface;
- a first transducer being disposed across said first surface and a second transducer being disposed across said second surface of said test block, said first and second transducers each having a longitudinal axis disposed generally perpendicularly to the direction of travel of said tire assembly and being operative to generate an electrical signal representative of a force produced by said tire assembly at that predetermined location; and
- signal receiving means for receiving said electrical signals from said transducers and for storing said signals representing the force produced by said tire assembly at that predetermined location, whereby said transducers are interchanged with said removable blanks at a plurality of predetermined locations so that a force distribution plot over said test block surfaces can be generated by said signal receiving means.

6. A method of producing a force distribution map of a plurality of forces produced by a tire assembly at a plurality of predetermined locations as the tire assembly rolls across a test apparatus having a stepped surface, the test apparatus including a plurality of removable blanks, each blank of said plurality having a longitudinal axis disposed generally perpendicular to the direction of travel of said tire assembly, said plurality being axially aligned adjacent one another along respective longitudinal axes and defining the stepped surface, the test apparatus further including a first transducer and a second transducer, the transducers being operative to measure a force produced by the tire assembly, the method comprising the steps of:
(a) removing two blanks from a first predetermined position of the test apparatus and inserting the first and second transducers therein;
(b) rolling the tire assembly across the test apparatus and measuring the force produced at each of said transducers;
(c) storing the force measurements generated by each of the transducers in a processor means;
(d) removing the transducers from the first predetermined positions and replacing the two blanks therein;
(e) removing two blanks from a second predetermined position remote from said first predetermined position and inserting the transducers therein;
(f) repeating steps (b–e) until a predetermined number of force measurements are stored in the processor means; and
(g) plotting the stored force measurements to obtain the force distribution map.

* * * * *